(12) United States Patent
Yusa et al.

(10) Patent No.: US 6,445,700 B1
(45) Date of Patent: Sep. 3, 2002

(54) SERIAL COMMUNICATION CIRCUIT

(75) Inventors: Atsushi Yusa; Mitsuya Ohie, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/052,127

(22) Filed: Mar. 31, 1998

(30) Foreign Application Priority Data

Apr. 2, 1997 (JP) ............................................. 9-099724

(51) Int. Cl.[7] ................................................. G06F 3/00
(52) U.S. Cl. ........................................... 370/366; 710/53
(58) Field of Search ................................ 370/412, 413, 370/414, 415, 416, 417, 418, 419, 423, 366; 710/29, 38, 52, 53, 56, 131

(56) References Cited

U.S. PATENT DOCUMENTS

| 4,298,954 | A | * | 11/1981 | Bigelow | 710/53 |
|---|---|---|---|---|---|
| 4,513,412 | A | * | 4/1985 | Cox | 370/337 |
| 5,187,780 | A | * | 2/1993 | Clark et al. | 370/366 |
| 5,469,432 | A | * | 11/1995 | Gat | 370/360 |
| 5,649,217 | A | * | 7/1997 | Yamanaka et al. | 370/395 |
| 5,799,209 | A | * | 8/1998 | Chatter | 710/38 |
| 6,035,345 | A | * | 3/2000 | Lee | 710/38 |

FOREIGN PATENT DOCUMENTS

| DE | 2 250 307 | 4/1974 |
|---|---|---|
| EP | 0 018 518 | 11/1980 |
| FR | 2 636 448 | 3/1990 |
| JP | 57003161 | 1/1982 |

\* cited by examiner

Primary Examiner—Wellington Chin
Assistant Examiner—Frank Duong
(74) Attorney, Agent, or Firm—Venable; Michael A. Sartori

(57) ABSTRACT

A serial communication circuit sends or receives a large amount of data speedily. A buffer 2a is connected to a serial interface circuit 1a, and a buffer 2b is connected to a serial interface circuit 1b. One end of a switch 4 is connected to the serial interface circuit 1a or the serial interface circuit 1b, and another end to a serial port 3. Switching the switch 4 sequentially to the serial interface circuit 1a and to the serial interface circuit 1b makes it possible to use the two buffers for sending data to, or receiving data from, one serial port 3.

12 Claims, 10 Drawing Sheets n: No. OF SEND/RECEIVE SIGNAL LINES

SERIAL COMMUNICATION CIRCUIT

BACKGROUND OF THE INVENTION

1. Field of the Invention

The present invention relates to a serial communication circuit used in an integrated circuit of a micro-controller and so forth.

2. Description of the Prior Art

In an integrated circuit used in a micro-controller and so forth, a serial communication circuit is used for sending and receiving serial data. In general, a conventional serial communication circuit is configured as described below.

FIG. 2 is a diagram showing the conventional serial communication circuit.

In the figure, 1a and 1b are serial interface circuits, 2a and 2b are buffers, and 3-0 and 3-1 are serial ports (channels). The internal configuration of the serial interface circuits 1a and 1b and the serial ports 3-0 and 3-1 are as follows.

FIG. 3 is a diagram showing the internal configuration of the serial communication circuit.

In the figure, a serial communication circuit 1 corresponds to the serial interface circuits 1a and 1b in FIG. 2. The serial communication circuit 1 is composed of a send shift register 11, a receive shift register 12, a send control circuit 13, a receive control circuit 14, and a baud rate generator 15. A buffer 2 corresponds to the buffers 2a and 2b in FIG. 2. The buffer 2 is composed of a send buffer 21 and a receive buffer 22. A serial port 3 corresponds to the serial ports 3-0 and 3-1 in FIG. 2. The serial port 3 has a receive data line RXD, a send data line TXD, a receive clock line RXC, and a send clock line TXC.

The send buffer 21 and the receive buffer 22 are connected to an internal bus such as a micro-controller. The send buffer 21 contains send data temporality, while the receive buffer 22 contains receive data temporarily. The send shift register 11 receives parallel send data from the send buffer 21 and converts it into serial data for transmission to the send data line TXD. The receive shift register 12 receives serial data via the receive data line RXD and converts it into parallel data for transmission to the receive buffer 22. The send control circuit 13 and the receive control circuit 14 control data transmission and reception based on synchronous clock signals. The baud rate generator 15 generates clock signals used for serial communication.

FIG. 4 is a diagram showing the configuration of conventional serial communication circuit. In the figure, number 100 is a micro-controller which has two serial communication circuits. Numbers 200 and 300 are external ICs to or from which the serial communication circuits send or receive data. Each IC has a pair of serial ports: 200A–200B and 300A–300B. The serial ports 200A and 300A are connected to the serial ports 3-0 and 3-1 on the micro-controller 100, while the serial ports 200B and 300B are connected to external ICs 200 and 300, respectively. Because the number of input/output signal lines depends on the serial interface circuits 1a and 1b, "n" is used to represent the number of input/output signal lines in FIG. 4 and FIG. 2.

The conventional serial communication circuit, which is independent as shown in FIG. 2, has the problems described below.

① When receive data is too large (the amount of one packet is large) to be stored in the receive buffer 22, the receiver must ask the sender to stop sending data temporarily and move data somewhere else, for example, to a RAM area. Then, when the receiver becomes ready to receive data, the receiver asks the sender to send data which immediately follows the data that has been sent. This takes long and requires a large amount of data processing on the receiver.

② When send data is too large to be stored in the send buffer 21 at a time, the sender must store a unit of data in the send buffer, send the unit of data and, after that, store the next unit of data in the buffer. This must be repeated until all data is sent, requiring a large amount of data processing on the sender. That is, having to store data in the send buffer each time it is sent interrupts communication and results in a long communication time. p0 ③ Usually, sending the same data to a plurality of receivers requires as many serial communication circuits. In a configuration in which the serial communication circuit is independent as shown in FIG. 2, the same data must be prepared for each serial communication circuit.

④ As shown in FIG. 4, communication between the external IC 200 and the external IC 300 requires the serial ports intended for this communication (serial ports 200B and 300B in the figure). These special ports are needed in addition to those for communication with serial communication circuits such as 3-0 and 3-1. Therefore, if there are a plurality of such nodes as external ICs 200 and 300 and serial communication circuit communication is performed among them, serial ports for communication among these nodes are necessary.

SUMMARY OF THE INVENTION

It is an object of the present invention to provide a serial communication circuit which sends or receives data speedily even if the amount of send or receive data is large To achieve this object, the present invention provides a switch which selects a serial interface circuit from a plurality of serial interface circuits, each with a buffer, and connects it to a serial port.

Therefore, to send data which is too large to be stored in one buffer, data is stored in a second buffer while data is being sent from a first buffer and, immediately after all data is sent from the first buffer, the switch is switched to the second buffer to send data from there. This allows a large amount of data to be sent continuously.

To receive data which is too large to be received in one buffer, the switch is switched to a second buffer when a first buffer becomes full. This allows a large amount of data to be received continuously.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENTS

A plurality of embodiments according to the present invention are described with reference to the attached drawings.

First Embodiment

Figure 1:
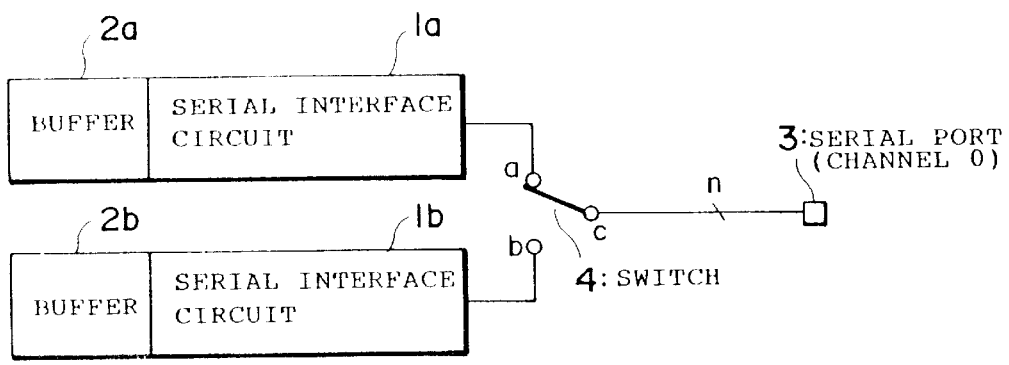
FIG. 1 is a diagram showing the configuration of a first embodiment of a serial communication circuit according to the present invention.
Figure 2:
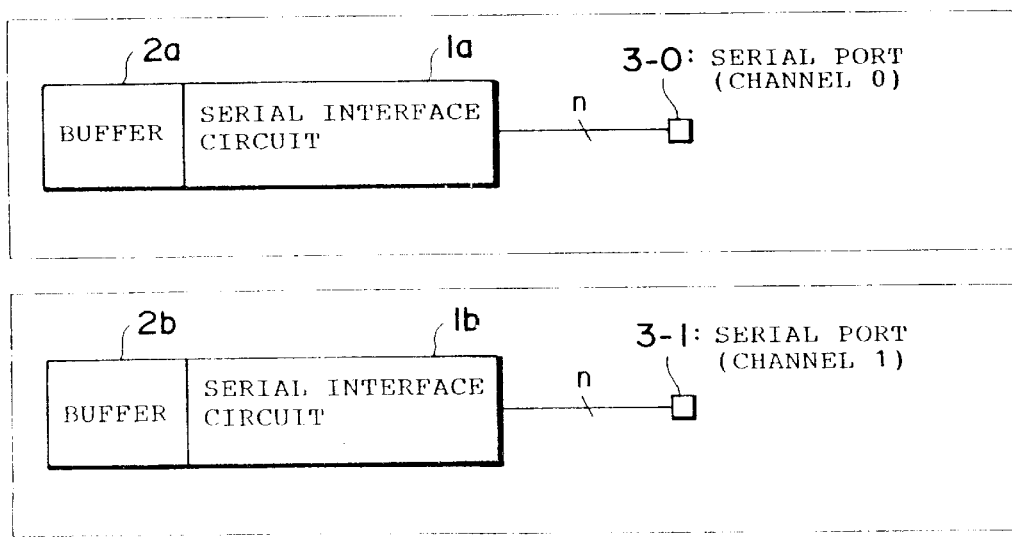
FIG. 2 is a diagram showing the configuration of a conventional serial communication circuit.
Figure 3:
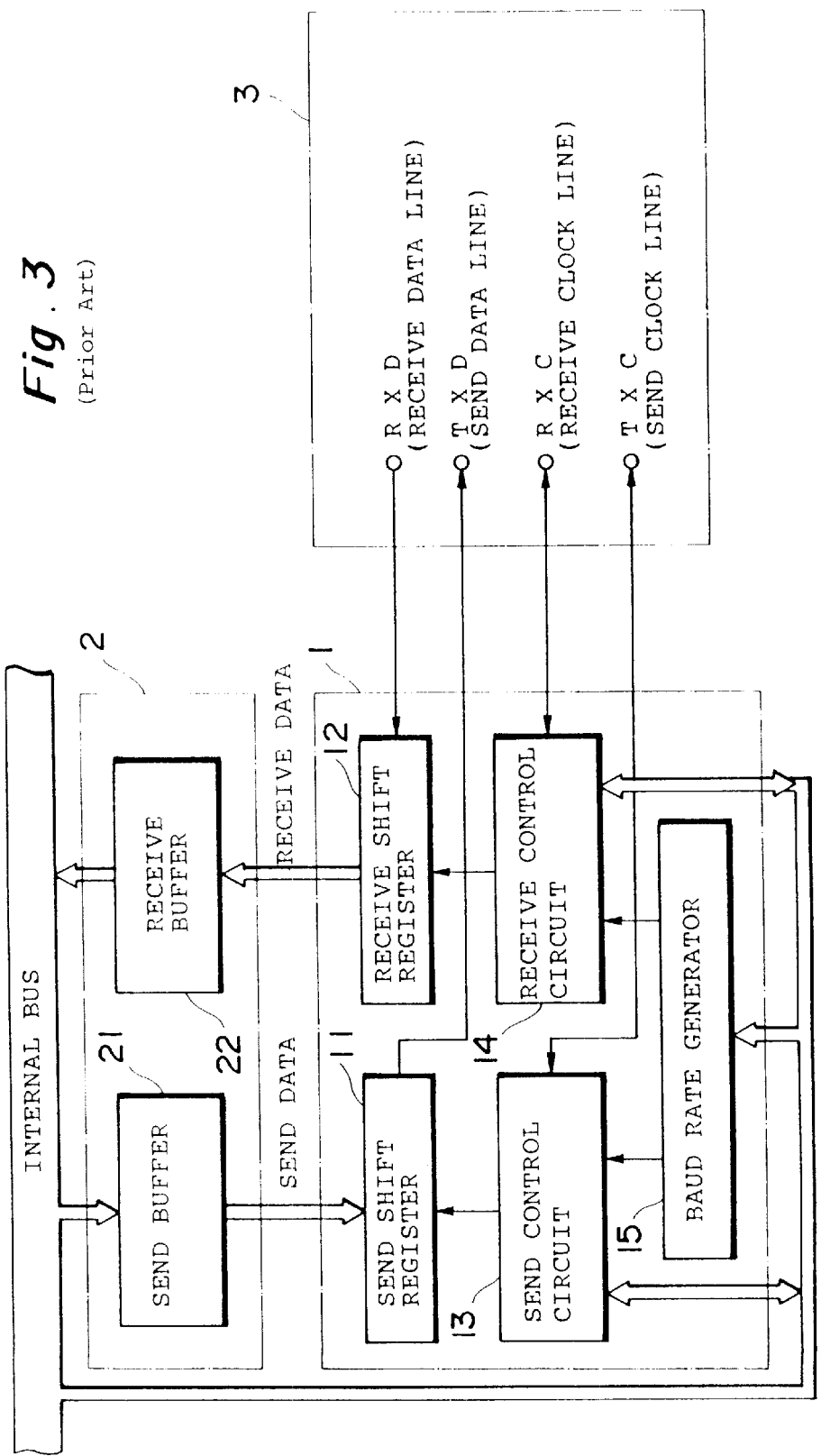
FIG. 3 is a diagram showing the internal configuration of a typical serial communication circuit.
Figure 4:
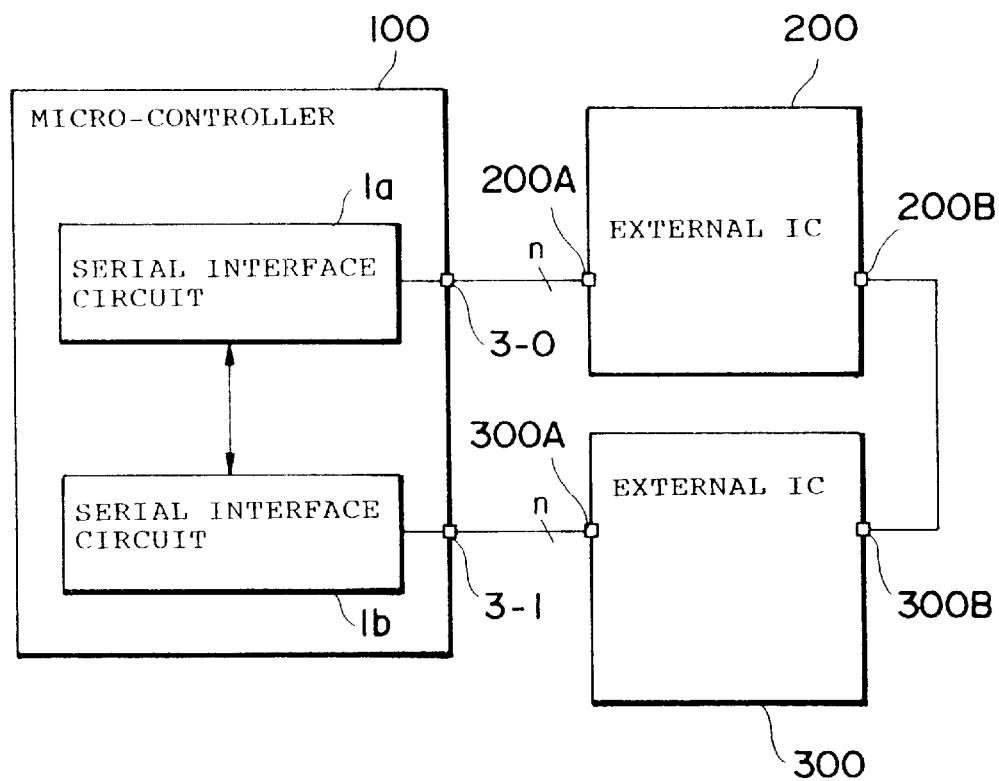
FIG. 4 is a diagram showing the connection of the conventional serial communication circuit.

FIG. 1 is a diagram showing the configuration of a first embodiment of the serial communication circuit according to the present invention.

The system in the figure comprises a serial interface circuit 1a, a serial interface circuit 1b, a buffer 2a, a buffer 2b, a serial port 3, and a switch 4.

The serial interface circuits 1a and 1b, similar to those used in the prior art, are interface circuits for sending and receiving serial data. Buffers 2a and 2b are send-receive buffers connected to the serial interface circuits 1a and 1b, respectively. The serial port 3 is a port (channel) connected to the serial interface circuits 1a and 1b via the switch 4. The switch 4 selectively connects one of two serial interface circuits, 1a or 1b, to the serial port 3. That is, one selection terminal, a, is connected to the serial interface circuit 1a and the other selection terminal, b, is connected to the serial interface circuit 1b, while the common terminal, c, is connected constantly to the serial port 3.

Next, a typical operation of the serial communication circuit with the above configuration is described. Assume that the switch 4 is now connected to the serial interface circuit 1a as shown in FIG. 1. In this case, the circuit operates as if the serial communication circuit of the prior art had one channel. When data is sent, send data stored in the buffer 2a is sequentially sent from the serial interface circuit 1a. When data is received, data from the serial port 3 is received via the serial interface circuit 1a and is stored in the buffer 2a. Similarly, when the switch 4 is connected to the serial interface circuit 1b, data is sent or received using the serial interface circuit 1b and buffer 2b.

To send data larger than the buffer 2a at a time, as much data as can be stored in buffer 2a is stored in buffer 2a and then the remaining data is stored in the buffer 2b. Data is sent from the buffer 2a via the serial interface circuit 1a and, immediately after all data in the buffer 2a is sent, the switch 4 is switched to the serial interface circuit 1b to send data from the buffer 2b via the serial interface circuit 1b.

A large amount of data exceeding the total size of the buffer 2a and buffer 2b is sent as follows. Data in the buffer 2a is sent first and, after all data in this buffer is sent, the switch 4 is switched to the serial interface circuit 1b to send data in the buffer 2b. While data in the buffer 2b is being sent, the next data is stored in the buffer 2a. The switch 4 is then switched to the serial interface circuit 1a to send data in the buffer 2a. Switching the switch 4 in this manner while storing data into one of the buffers not used for sending data at that time allows a large amount of data to be sent continuously.

To receive data larger than the buffer 2a at a time, data is received via the serial interface circuit 1a and as much data as can be stored in buffer 2a is stored in buffer 2a. When the buffer 2a becomes full, the switch 4 is switched to the serial interface circuit 1b. Data is then received via the serial interface circuit 1b, and data is stored in the buffer 2b. While data is being stored in the buffer 2b, data received in the buffer 2a is processed. Then, the switch 4 is switched again and data is received via the serial interface circuit 1a. The repetition of this operation allows a large amount of data to be received continuously.

In the above configuration, the switch operation of the switch 4, triggered by the "buffer-full" detection signal, is automatically processed by the hardware. This switch may also be switched by the software by causing the "buffer-full" interrupt in a built-in circuit such as a micro-controller. The following explains the configuration of this example.

Figure 5:
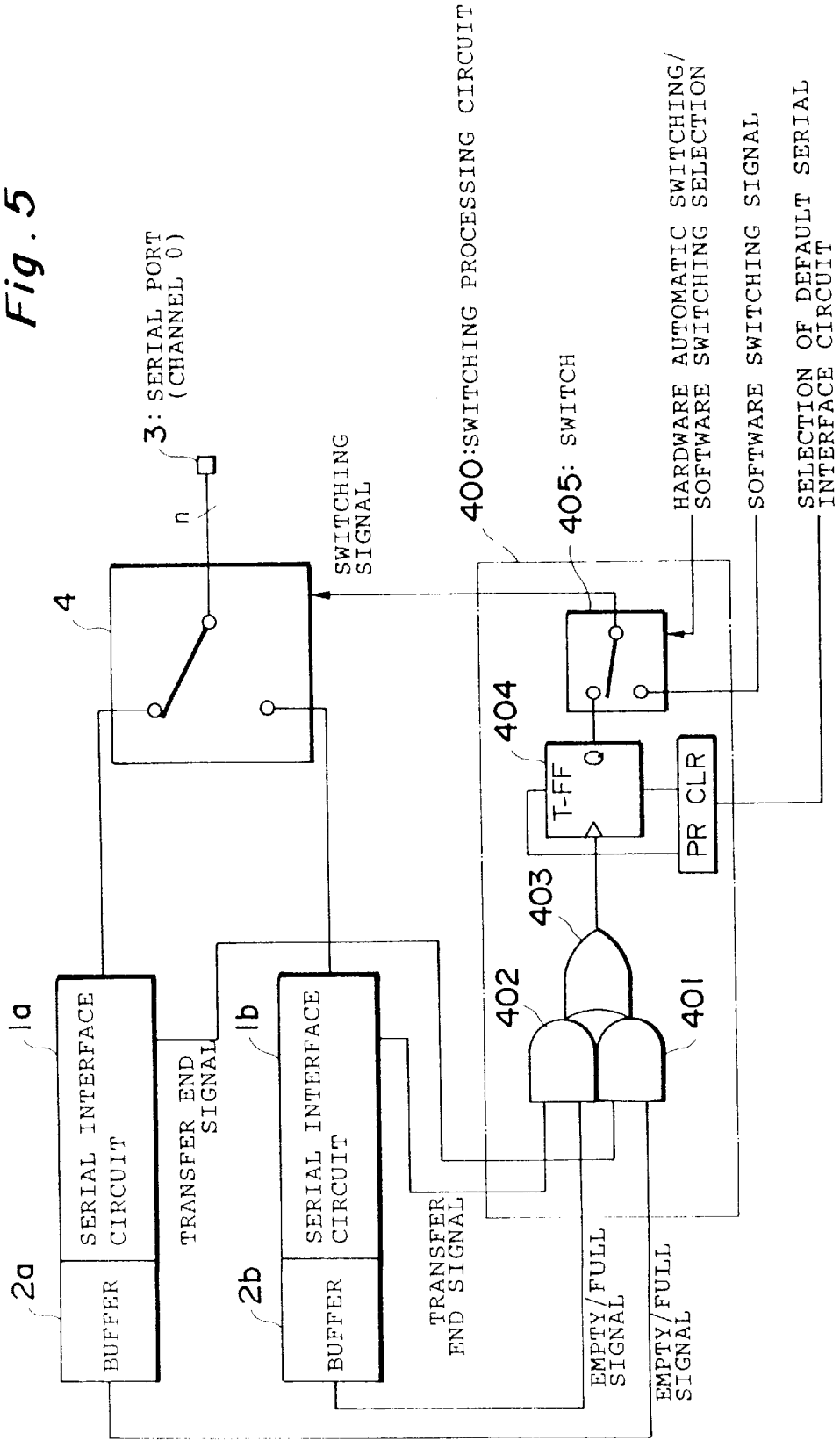
FIG. 5 is a diagram showing the configuration of a switch processing circuit used in the first embodiment of the serial communication circuit according to the present invention.

FIG. 5 is a diagram showing the configuration of a switching circuit which controls the operation of the switch 4.

In this figure, the switching circuit 400 comprises an AND circuit 401, an AND circuit 402, an OR circuit 403, a T-flip-flop (FF) 404, and a switch 405. The AND circuit 401 ANDs the empty/full signal indicating the status of the buffer 2a and the transfer end signal indicating the status of the serial interface circuit 1a. The AND circuit 402 ANDs the empty/full signal indicating the status of the buffer 2b and the transfer end signal indicating the status of the serial interface circuit 1b. The OR circuit 403 ORs the output of the AND circuit 401 and the output of the AND circuit 402 and sends this logical sum output to the T-flip-flop 404. The output Q of the T-flip-flop 404 is set via the switch 405 to the switch 4 for use as the switch signal. The switch 405 selects the switching mode of the switch 4 from the two: hardware automatic switching mode and software switching mode. PR and CLR which are sent to the T-flip-flop 404 are the pre-set signal and the clear signal, respectively.

The switching circuit 400 with the configuration described above operates as follows. For example, when data is sent, the buffer 2a is switched to the buffer 2b in the following sequence. When both the empty signal from the buffer 2a and the transfer end signal from the serial interface circuit 1a are on, the AND circuit 401 outputs the on signal. This on signal is sent to the T-flip-flop 404 via the OR circuit 403, reversing the output of the T-flip-flop 404. Then, the reversed switching signal is sent to the switch 4, causing the switch 4 to switch to the serial interface circuit 1b. As a result, data stored in the buffer 2b is set via the serial interface circuit 1b, and the on signal is output from the AND circuit 402. The output of the T-flip-flop 404 is reversed, and the switch 4 is switched to the serial interface circuit 1a again.

When data is received, the switch 4 is switched by the buffer-full signal from the buffer 2a or 2b and the transfer end signal from the serial interface circuit 1a or 1b in the same manner as when data is sent.

When the switch 4 is switched by the software, the switch 405 is switched by the software switch signal.

In the first embodiment described above, the switch 4 which selectively connects to the serial interface circuit 1a connected to the buffer 2a or to the serial interface circuit 1b connected to buffer 2b enables two serial communication circuits, 1a and 1b, to be connected interchangeably to one serial port 3. As a result, switching between the buffer 2a and the buffer 2b, each with a small size, allows a large amount of data to be sent or received continuously. The addition of the hardware-operated switch 4 for automatic switching further increases the speed, especially in a micro controller, thus reducing the amount of CPU processing.

In the first embodiment, two pairs composed of the serial interface circuit 1a to which the buffer 2a is connected and the serial interface circuit 1b to which the buffer 2b is connected are used. The embodiment is not limited to this configuration. For example, three or more pairs may be used, in which case the switch 4 selects one of three or more serial communication circuits.

Second Embodiment

In a second embodiment, each of a plurality of serial communication circuits has a switch to enable a plurality of buffers to be selectively connected. That is, two sets of a serial communication circuit (1a or 1b) and a buffer (2a or 2b) are switched by the switch 4 in the first embodiment described above. In the second embodiment, a buffer is switched for connection to a serial communication circuit.

Figure 6:
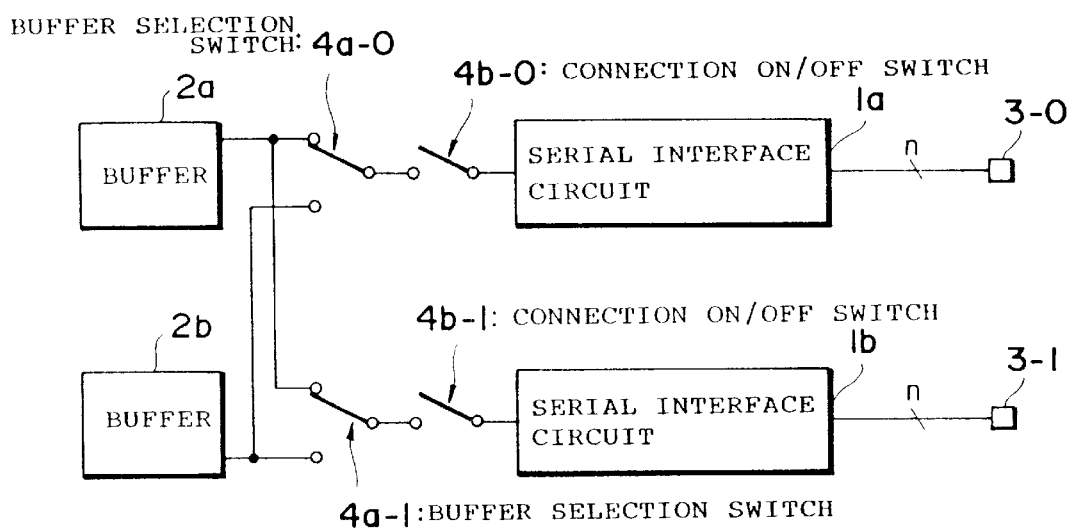
FIG. 6 is a diagram showing the configuration of a second embodiment of the serial communication circuit according to the present invention.

FIG. 6 is a diagram showing the configuration of the second embodiment.

The system in the figure comprises a serial interface circuit 1a, a serial interface circuit 1b, a buffer 2a, a buffer 2b, a serial port 3-0, a serial port 3-1, a buffer selection switch 4a-0, a buffer selection switch 4a-1, a connection on/off switch 4b-0, and a connection on/off switch 4b-1. The description of the serial interface circuits 1a and 1b and the buffers 2a and 2b is omitted here because their functions are similar to those of the first embodiment. Serial ports 3-0 and 3-1 are ports connected to serial interface circuits 1a and 1b, respectively.

Each of the buffer selection switches, 4a-0 and 4a-1, connects one of two buffers 2a and 2b and one of two serial interface circuits 1a and 1b. Each of the connection on/off switches, 4b-0 and 4b-1, turns on or off the connection between one of the buffers 2a and 2b selected by the buffer selection switch 4a-0 or 4a-1 and the serial interface circuit 1a or serial interface circuit 1b.

A typical operation of the serial communication circuit with the above configuration is described. To use the system with the configuration described above in the similar manner as in the conventional serial communication circuit, the buffer selection switch 4a-0 is connected to the buffer 2a and the buffer selection switch 4a-1 is connected to the buffer 2b with the connection on/off switches 4b-0 and 4b-1 turned on. In this case, the buffer 2a is connected to the serial interface circuit 1a via the buffer selection switch 4a-0 and the connection on/off switch 4b-0. Similarly, the buffer 2b is connected to the serial interface circuit 1b via the buffer selection switch 4a-1 and the connection on/off switch 4b-1. Note that the same configuration is built when the buffer selection switch 4a-0 selects the buffer 2b and when the buffer selection switch 4a-1 selects the buffer 2a.

Next, how data larger than the buffer 2a is sent via the serial port 3-0 at a time is described. Assume that the connection on/off switch 4b-0 is turned on and that the connection on/off switch 4b-1 is turned off. As much data as can be stored in the buffer 2a is stored in the buffer 2a, the remaining data is stored in the buffer 2b, and then data in the buffer 2a is sent via the serial interface circuit 1a. Immediately after all data in the buffer 2a is sent, the buffer selection switch 4a-0 is switched to the buffer 2b, and data in the buffer 2b is sent via the serial interface circuit 1a.

In addition, to send data larger than the total size of the buffer 2a and the buffer 2b via the serial port 3-0, the connection on/off switch 4b-0 is turned on and the connection on/off switch 4b-1 is turned off as in the above case. Data is sent from the buffer 2a and, after all data is sent, the buffer selection switch 4a-0 is switched to the buffer 2b to send data from the buffer 2b. While data is being sent from the buffer 2b, the remaining data is stored in the buffer 2a. Next, the buffer selection switch 4a-0 is switched to the buffer 2a again to send data from the buffer 2a. Switching the buffer selection switch 4a-0 sequentially and storing data in one of the buffers 2a and 2b which is not being used allow a large amount of data to be sent continuously.

Next, how receive data larger than the buffer 2a is received via the serial port 3-0 at a time is described. Assume that the connection on/off switch 4b-0 is turned on and that the connection on/off switch 4b-1 is turned off. First, the buffer selection switch 4a-0 is connected to the buffer 2a to receive data via the serial interface circuit 1a into the buffer 2a. When the buffer 2a becomes full, the buffer selection switch 4a-0 is switched to the buffer 2b to store data in the buffer 2b. While data is being stored in the buffer 2b, data received in the buffer 2a is processed. Then, the buffer selection switch 4a-0 is switched to the buffer 2a to store data there. The repetition of this operation allows a large amount of data to be received continuously.

Because the serial port 3-0 is used in the send/receive operation described above, the connection on/off switch 4b-0 is turned on. To send or receive data via the serial port 3-1, the connection on/off switch 4b-0 is turned off and the connection on/off switch 4b-1 is turned on. In this case, the buffer selection switch 4a-1 is used to select one of the buffers 2a and 2b to perform the same operation as is descried above.

In addition, it is possible to send the same data from the serial interface circuits 1a and 1b to the serial ports 3-0 and 3-1 by connecting both the serial interface circuits 1a and 1b to one of the buffers 2a and 2b. For example, to send data from the buffer 2a via the serial port 3-0 and the serial port 3-1 at the same time, the buffer selection switches 4a-0 and 4a-1 are connected to the buffer 2a and both the connection on/off switches 4b-0 and 4b-1 are turned on. To send data from the buffer 2b via the serial ports 3-0 and 3-1 at the same time, the buffer selection switches 4a-0 and 4a-1 are connected to the buffer 2b and both the connection on/off switches 4b-0 and 4b-1 are turned on.

As in the first embodiment, the operation of the buffer selection switches 4a-0 and 4a-1 and the connection on/off switches 4b-0 and 4b-1 may be switched automatically by the hardware or by an interrupt generated by the software.

The second embodiment described above has the buffer selection switches 4a-0 and 4a-1 and the connection on/off switches 4b-0 and 4b-1 to selectively connect the two buffers 2a and 2b to the two serial interface circuits 1a and 1b. It gives the following advantages.

① The serial interface circuit 1a or 1b may be used for sending or receiving data continuously.

② The combination of the buffers (2a and 2b) and the serial interface circuits (1a and 1b) may be changed flexibly. For example, the buffer 2a is connected permanently to the serial interface circuit 1a as if they formed an independent channel or the buffer 2a is connected to the serial interface circuit 1b.

③ The same data may be sent via the two serial ports 3-0 and 3-1 at the same time.

The second embodiment described above has two buffers, 2a and 2b, and two serial interface circuits, 1a and 1b. The number of buffers and the number of serial interface circuits need not always be two. As long as the number of connection on/off switches equals the number of serial interface circuits and as long as the number of buffer selection switches which may select any of the buffers equals the number of connection on/off switches, the number of buffers and the number of serial interface circuits may be any number that is two or larger.

Third Embodiment

The second embodiment described above has two buffer selection switches 4a-0 and 4a-1 and two connection on/off switches 4b-0 and 4b-1. A system with one buffer selection switch and one connection on/off switch may also send or receive data to or from buffers 2a and 2b. The following describes a third embodiment which has such a configuration.

Figure 7:
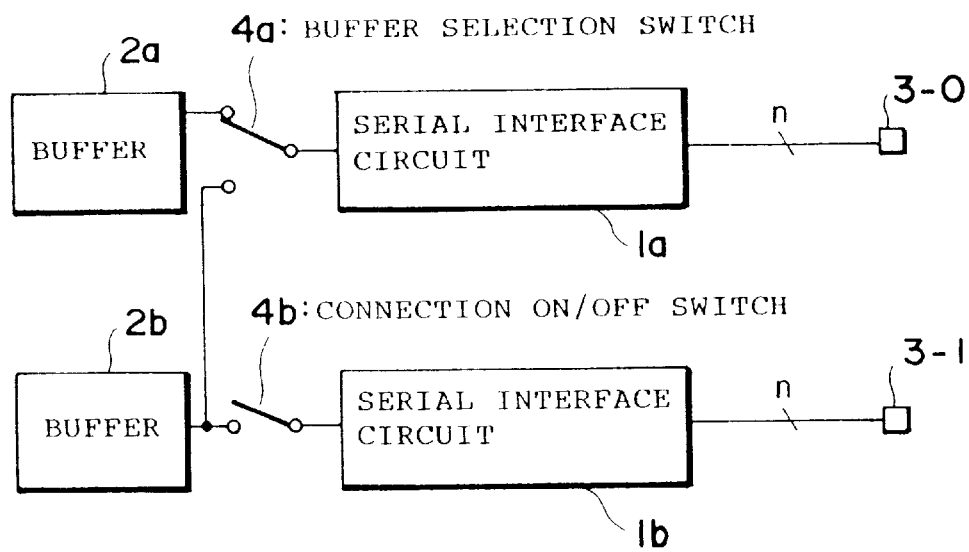
FIG. 7 is a diagram showing the configuration of a third embodiment of the serial communication circuit according to the present invention.

FIG. 7 is a diagram showing the configuration of the third embodiment.

In the figure, the system comprises a serial interface circuit 1a, a serial interface circuit 1b, a buffer 2a, a buffer 2b, a serial port 3-0, a serial port 3-1, a buffer selection switch 4a, and a connection on/off switch 4b. The description of the components other than the buffer selection switch 4a and the connection on/off switch 4b is omitted here because they are the same as those of the second embodiment.

The buffer selection switch 4a selectively connects the buffer 2a and the buffer 2b to the serial interface circuit 1a. The connection on/off switch 4b turns on or off the connection between the buffer 2b and the serial interface circuit 1b.

A typical operation of the serial communication circuit of the third embodiment which has the above configuration is described.

When the third embodiment is used like a system with the conventional configuration, the buffer selection switch 4a is switched to the buffer 2a to connect the buffer 2a to the serial interface circuit 1a. The connection on/off switch 4b is turned on to connect the buffer 2b to the serial interface circuit 1b. This causes the buffer 2a and the serial interface circuit 1a to connect to the serial port 3-0, and the buffer 2b and the serial interface circuit 1b to connect to the serial port 3-1.

Next, how data larger than the buffer 2a is sent via the serial port 3-0 at a time is described. Assume that the connection on/off switch 4b-0 is turned off. As much data as can be stored in the buffer 2a is stored in the buffer 2a, the remaining data is stored in the buffer 2b, and data is sent from the buffer 2a via the serial interface circuit 1a. Immediately after all data is sent from the buffer 2a, the buffer selection switch 4a is switched to the buffer 2b to send data from the buffer 2b via the serial interface circuit 1a.

How data larger than the total size of the buffer 2a and the buffer 2b is sent is described. Assume that the connection on/off switch 4b is turned off as in the above case. Data is sent from the buffer 2a and, after data is sent, the buffer selection switch 4a is switched to the buffer 2b to send data from the buffer 2b. While data is being sent from the buffer 2b, the remaining data is stored in the buffer 2a, the buffer selection switch 4a is switched to the buffer 2a again, and data is sent from the buffer 2a. Switching the buffer selection switch 4a sequentially and storing data in one of the buffers 2a and 2b which is not being used allow a large amount of data to be sent continuously.

Next, how data larger than the buffer 2a is received at a time is described. Assume that data is received via the serial port 3-0 and that the connection on/off switch 4b is off. First, data is received via serial interface circuit 1a into the buffer 2a. When the buffer 2a becomes full, the buffer selection switch 4a is switched to the buffer 2b to store data into the buffer 2b. While data is being stored in the buffer 2b, data received in the buffer 2a is processed and then the buffer selection switch 4a is switched again to store data in the buffer 2a. The repetition of this operation allows a large amount of data to be received continuously.

As in the first and the second embodiments, the operation of the buffer selection switch 4a and the connection on/off switches 4b may be switched automatically by the hardware or by an interrupt generated by the software.

As described above, the third embodiment uses the buffer selection switch 4a and the connection on/off switch 4b to connect two buffers 2a and 2b selectively to the serial interface circuit 1a. This configuration gives the same advantages as that of the first embodiment. At the same time, switching control performed by the buffer selection switch 4a and connection on/off switch 4b allows the system to be used as an independent channel. In addition, fewer switches than in the second embodiment simplifies the configuration, reducing the packaging area in an integrated circuit.

In the third embodiment, two buffers, 2a and 2b, are selectively connected to one serial interface circuit 1a. Note that the number of buffers need not always be two. For example, three or more buffers may be used, in which case the buffer selection switch 4a is configured so that it may be switched to one of three or more buffers. In addition, the number of serial interface circuits, 1a and 1b, may be three or more. In this case, one of the serial interface circuits is allowed to selectively connect to a plurality of buffers with the remaining serial interface circuits being connected to their buffers under control of the connection on/off switches.

Fourth Embodiment

The fourth embodiment enables one serial interface circuit to selectively send data to, or receive data from, a plurality of serial ports at the same time.

Figure 8:
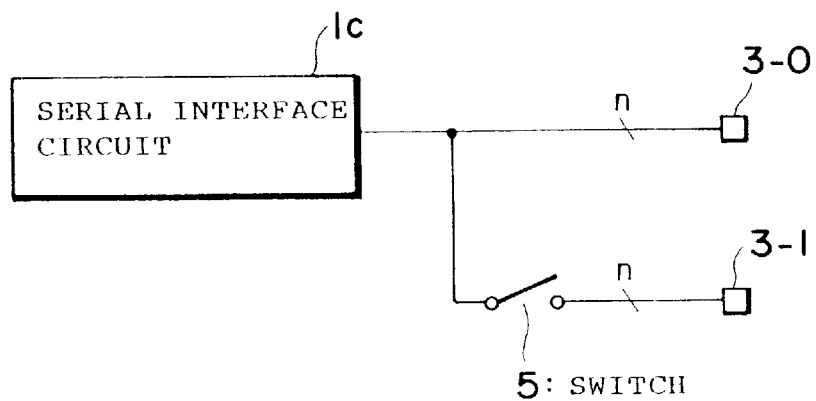
FIG. 8 is a diagram showing the configuration of a fourth embodiment of the serial communication circuit according to the present invention.

FIG. 8 is a diagram showing the configuration of the fourth embodiment.

The system in the figure comprises a serial interface circuit 1c, a serial port 3-0, a serial port 3-1, and a switch 5. Although no buffer is provided in this embodiment, a buffer may be connected to the serial interface circuit 1c as in the above embodiments. The description of the serial interface circuit 1c and the serial ports 3-0 and 3-1 is omitted here because their functions are the same as those of the embodiments 1 and 2. In this embodiment, the serial interface circuit 1c is connected directly to the serial port 3-0. The serial interface circuit 1c is connected to the serial port 3-1 via the switch 5.

The switch 5, with one end connected to the serial interface circuit 1c and the other end connected to the serial port 3-1, turns on or off the connection between them.

The fourth embodiment with the above configuration operates as follows. When the switch 5 is off, the send and receive operations are the same as those in a conventional system where there is only one serial communication circuit. Turning on the switch 5 when data is sent causes data in the serial interface circuit 1c to be sent to the serial port 3-0 and the serial port 3-1 at the same time. However, when data is received, data cannot be received from the serial port 3-0 and the serial port 3-1 at the same time. Thus, data is received only from the serial port 3-0.

In the fourth embodiment described above, the switch 5 connects one serial interface circuit 1c to two serial ports 3-0 and 3-1, making it possible to send the same data to a plurality of nodes at the same time. This implements broadcast mode communication (transmission of the same data to a plurality of nodes) easily and efficiently. The ability to do this operation with only one serial interface circuit 1c reduces the amount of required hardware.

There may be a plurality of combinations of the switch 5 and the serial port 3-1. The following explains a system with this configuration as an example of application of the fourth embodiment.

Figure 9:
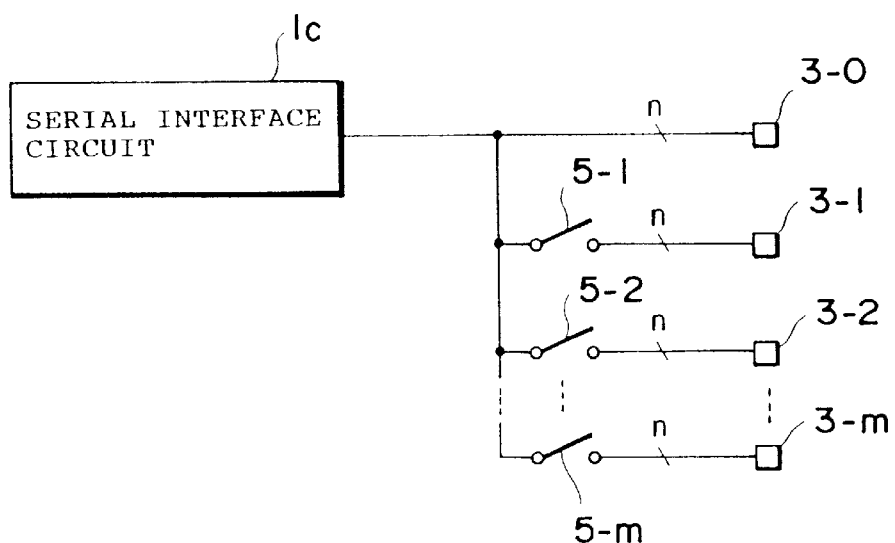
FIG. 9 is a diagram showing the configuration of an application in the fourth embodiment of the serial communication circuit according to the present invention.

FIG. 9 is a diagram showing the configuration of an application of the fourth embodiment.

The system shown in the figure has a plurality of sets of switch 5 and the serial port 3-1 used in the system shown in FIG. 8. That is, serial ports 3-1 to 3-m are connected to the serial interface circuit 1c via switches 5-1-5-m, respectively. Serial ports 3-1 to 3-m are selectively connected to the serial interface circuit 1c.

The send/receive operation of a serial communication circuit with this configuration, which is controlled by the simultaneous switching of the switches 5-1 to 5-m, is similar to the operation of the fourth embodiment shown in FIG. 8 except that a plurality of serial ports 3-1 to 3-m are used instead of one serial port 3-1 in the fourth embodiment. That is, the user can select either the operation of the serial port 3-0 only or the operation of all serial ports 3-0 to 3-m.

In this application, the switches 5-1 to 5-m may be turned on or off in a time-dividing mode. For example, different data is sent from the serial interface circuit 1c to each of serial port 3-1 to 3-m and, in synchronization of this data output operation, switches 5-1 to 5-m are turned on sequentially. This allows one serial interface circuit 1c to send different data to a plurality of serial ports 3-1 to 3-m. In this case, all data sent to the serial port 3-1 to 3-m is sent to serial port 3-0. This means that a system may be built in which the serial port 3-0 is a main circuit which requires all data and each of serial ports 3-1 to 3-m is a sub-circuit.

Fifth Embodiment

In a fifth embodiment, one serial interface circuit is selectively connected to two serial ports. On the other hand, when the connection between the serial interface circuit and the serial ports is off, two serial ports may be connected.

Figure 10:
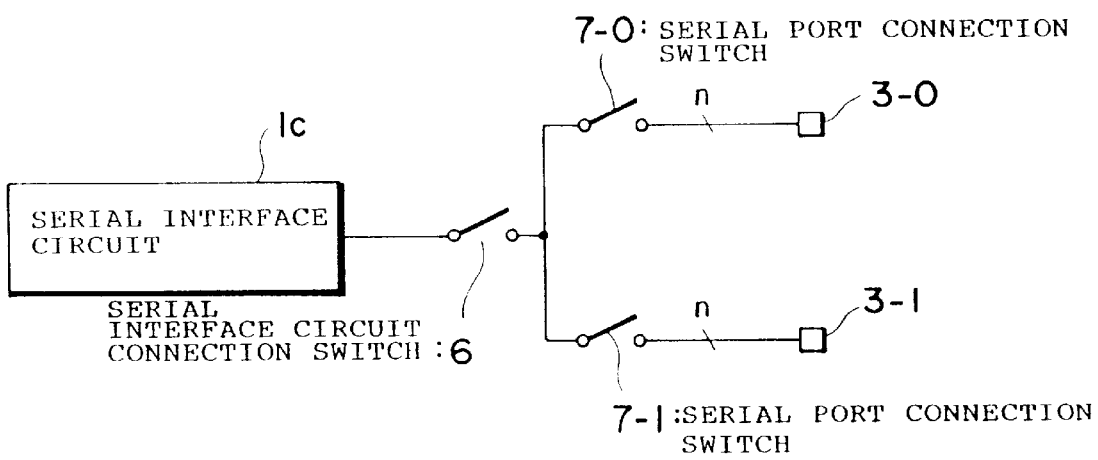
FIG. 10 is a diagram showing the configuration of a fifth embodiment of the serial communication circuit according to the present invention.

FIG. 10 is a diagram showing the configuration of the fifth embodiment.

The system in the figure comprises a serial interface circuit 1c, a serial port 3-0, a serial port 3-1, a serial interface circuit connection switch 6, a serial port connection switch 7-0, and a serial port connection switch 7-1. The description of the serial interface circuit 1c and the serial ports 3-0 and 3-1 is omitted here because their functions are the same as those of the above embodiments. One end of the serial interface circuit connection switch 6 is connected to the serial interface circuit 1c, and the other end to the common end of the serial port connection switches 7-0 and 7-1. The other end of each of the serial port connection switches 7-0 and 7-1 is connected to the serial ports 3-0 and 3-1, respectively.

Figure 11:
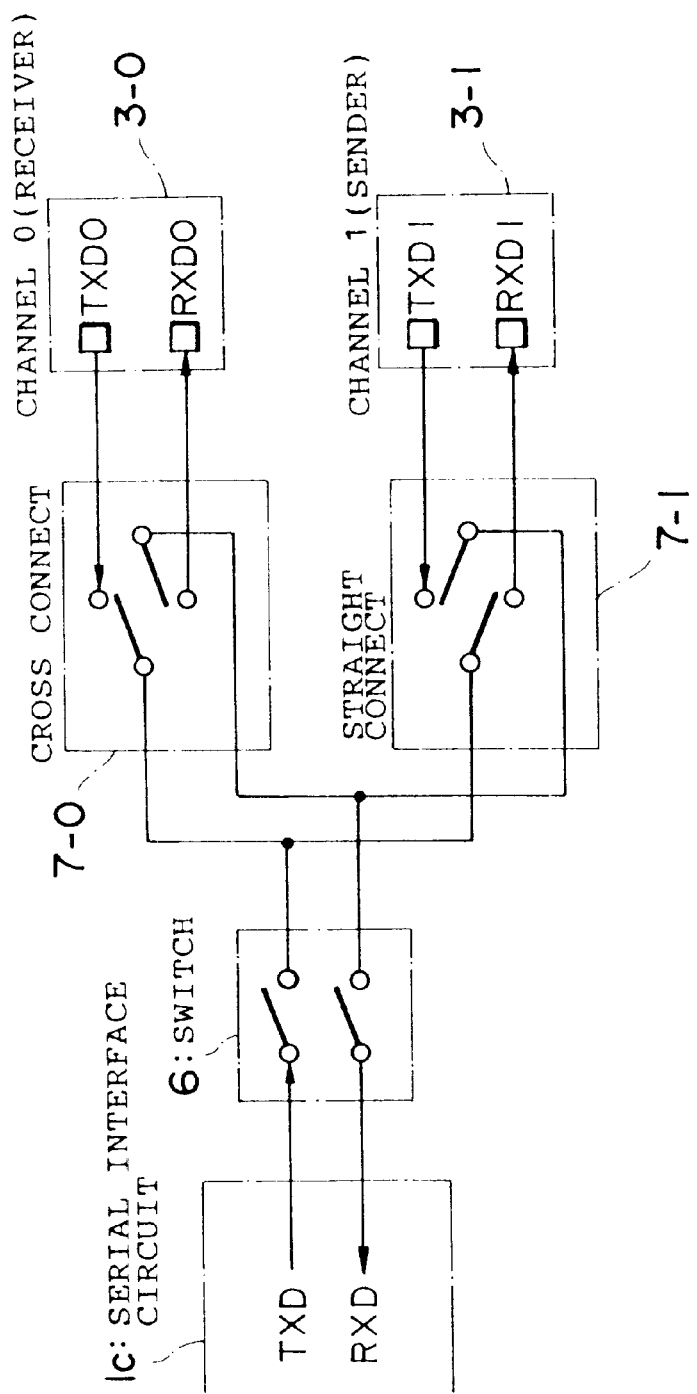
FIG. 11 is a diagram explaining the details of a switch used in the fifth embodiment of the serial communication circuit according to the present invention.

FIG. 11 is a diagram showing the details of the switches 6, 7-0, and 7-1 used in the fifth embodiment.

As shown in the figure, the serial interface circuit connection switch 6 turns on or off a send data line TXD and a receive data line RXD. The serial port connection switches 7-0 and 7-1 may be cross-connected.

Figure 12:
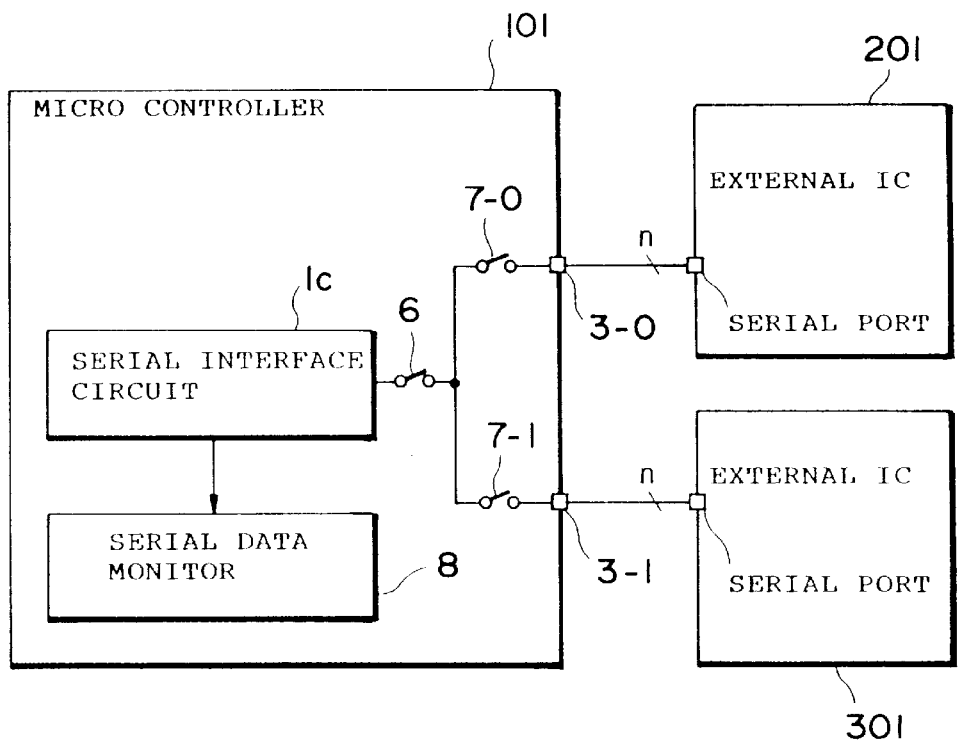
FIG. 12 is a diagram showing the connection of the fifth embodiment of the serial communication circuit according to the present invention.

FIG. 12 is a diagram showing the connection of a system to which the fifth embodiment is applied.

In this system, a serial communication circuit is contained in a micro-controller 101 to which an external IC 201 and a external IC 301 are connected via the serial ports 3-0 and 3-1. A serial data monitor 8 in the micro-controller 101 monitors serial data sent or received via the serial interface circuit 1c.

A typical operation of the serial communication circuit of the fifth embodiment which has the above configuration is described with reference to a connection example shown in FIG. 12. First, when the serial port connection switches 7-0 and 7-1 are turned on, the serial port 3-0 and the serial port 3-1 are connected. In this state, the external IC 201 and the external IC 301 are connected via the micro-controller 101. Thus, serial communication is possible between the external IC 201 and the external IC 301 (bypass mode). In this case, one of the serial port connection switches 7-0 and 7-1 has a data line cross-connected. That is, when data is sent from the external IC 201 to the external IC 301, the serial port connection switch 7-1 is cross-connected. When data is sent from the external IC 301 to the external IC 201, the serial port connection switch 7-0 is cross-connected (as shown in FIG. 11). That is, a channel on a receiving side is cross-connected.

Next, when the serial interface circuit connection switch 6 is turned on, data from the external IC 201 is sent to the external IC 301 (with the serial port connection switch 7-1 cross-connected) and, at the same time, to the serial interface circuit 1c. When the serial port connection switch 7-0 is turned off, data may be transferred between the serial interface circuit 1c and the external IC 301. When only the serial port connection switch 7-1 is turned off with the serial interface circuit connection switch 6 and the serial port connection switch 7-0 turned on, data may be transferred between the serial interface circuit 1c and the external IC 201.

As described above, the fifth embodiment has the serial interface circuit connection switch 6 and the serial port connection switches 7-0 and 7-1. By switching the switches 6, 7-0, and 7-1, not only the serial ports 3-0 and 3-1 may be bypass-connected but also one of the serial ports 3-0 and 3-1 may be selectively connected to the serial interface circuit 1c. The embodiment has the following advantages.

For example, the external IC 201 connected to the serial port 3-0 and the external IC 301 connected to the serial port 3-1 may be directly connected by turning on the serial port connection switches 7-0 and 7-1. This eliminates the need for additional wiring and additional serial ports for communication between the external IC 201 and the external IC 301 which are required in a conventional system. Instead, serial data may be transferred (in bypass mode) via the serial ports 3-0 and 3-1 in the micro-controller 101. In addition, as compared with data transfer via the micro-controller of the conventional system, data may be transferred without any load on the micro-controller CPU and without wasting time.

When all the switches 6, 7-0, and 7-1 are on in a system such as the one in FIG. 12, the same data may be sent from the external IC 201 to the micro-controller 101 and the external IC 301 at the same time. Of course, data may be sent from the external IC 301 to the micro-controller 101 and the external IC 201. In addition, when no clock pulse is present in the external IC 201 and the external IC 301, the synchronization clock pulse may be supplied from the micro-controller 101 to them. Although the serial communication circuit is installed in the micro-controller 101 in this example, the serial communication circuit installed in an integrated circuit other than the micro-controller 101 gives the same advantage.

The fifth embodiment described above has two channels. The number of channels need not always be two; it may be three or more as in the following example.

Figure 13:
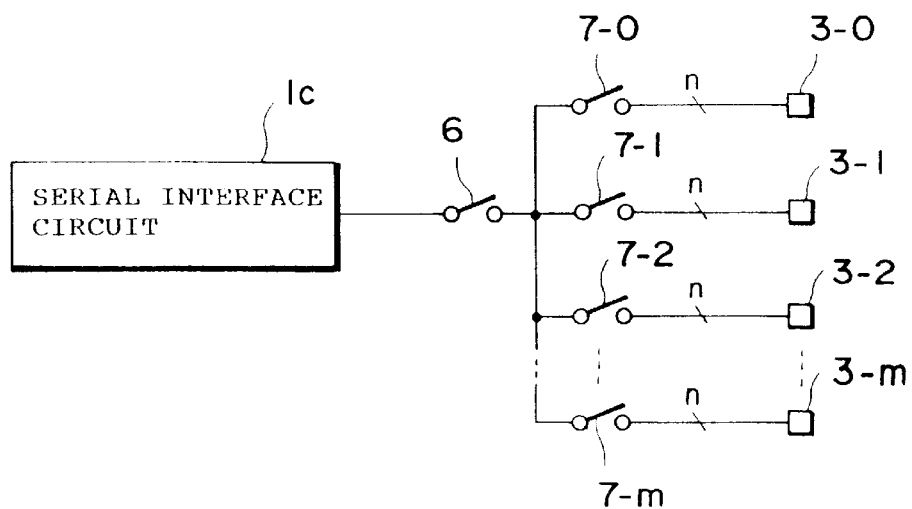
FIG. 13 is a diagram showing the configuration of an application in the fifth embodiment of the serial communication circuit according to the present invention.

FIG. 13 is a diagram showing the configuration of an application of the fifth embodiment.

In the figure, one end of each of the serial port connection switches 7-0 to 7-m is connected to the serial interface circuit connection switch 6 with the other end connected to one of the serial ports 3-0 to 3-m.

When the serial interface circuit connection switch 6 is turned off in this configuration, selectively turning on the serial port connection switches 7-0 to 7-m directly connects the external circuits connected to the corresponding serial ports 3-0 to 3-m, thus transferring data between those serial ports. In addition, turning on the serial interface circuit connection switch 6 allows data to be transferred between the serial interface circuit 1c and any of the serial ports 3-0 to 3-m as in the fifth embodiment described above.

Sixth Embodiment

A sixth embodiment, which combines the embodiments 1, 4, and 5 described above, has a configuration in which as many serial port connection switches as serial ports are provided for each serial interface circuit connection switch.

Figure 14:
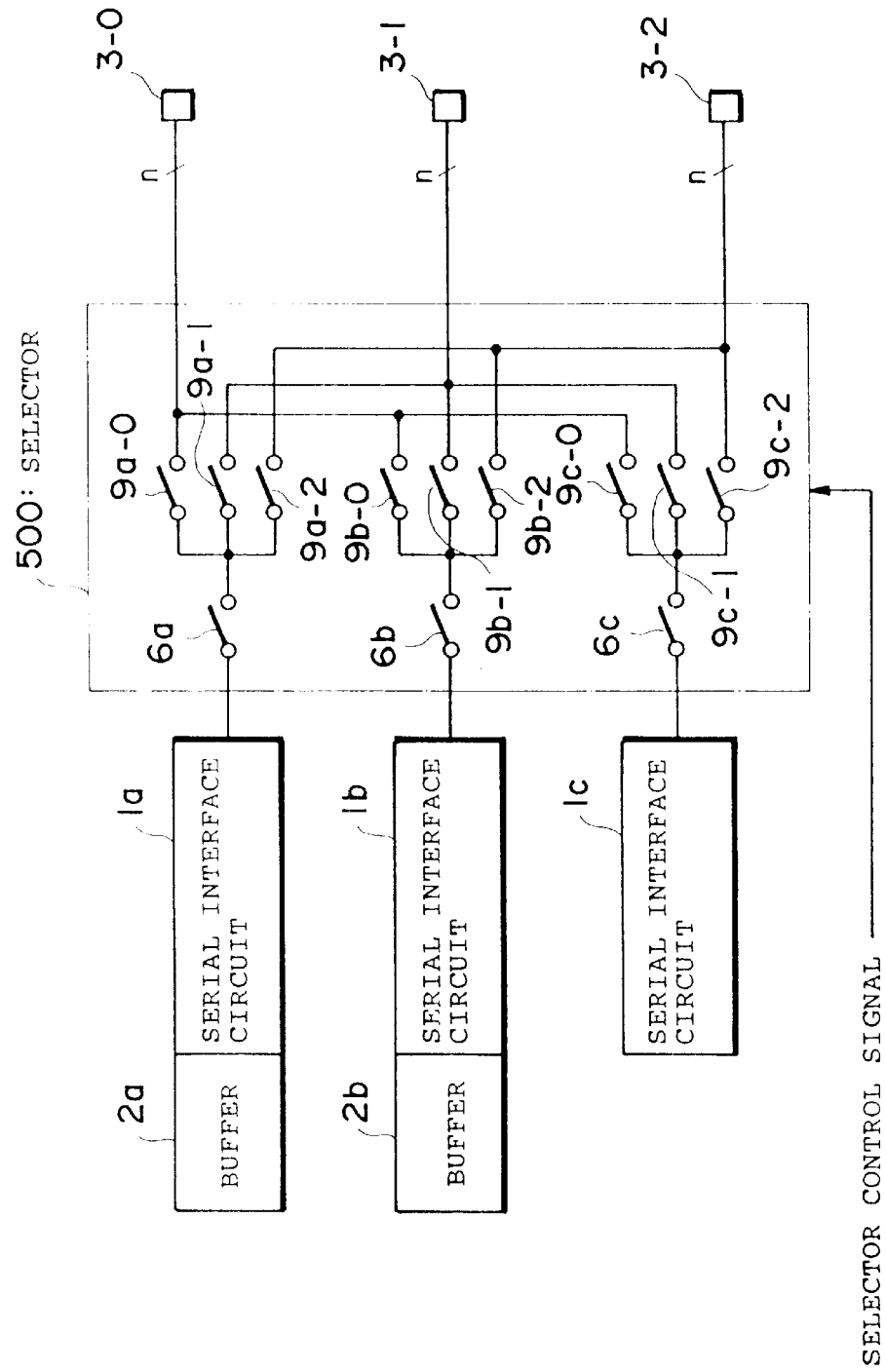
FIG. 14 is a diagram showing the configuration of a sixth embodiment of the serial communication circuit according to the present invention.

FIG. 14 is a diagram showing the configuration of the sixth embodiment.

A system in the figure comprises a serial interface circuit 1a, a serial interface circuit 1b, a serial interface circuit 1c, a buffer 2a, a buffer 2b, a serial port 3-0, a serial port 3-1, a serial port 3-2, and a selector 500. The description of the serial interface circuits 1a, 1b, and 1c, buffers 2a and 2b, and serial ports 3-0, 3-1, and 3-2 is omitted here because they are the same as those used in the above embodiments.

The selector 500 comprises serial interface circuit connection switches 6a, 6b, and 6c and as many serial port connection switches as serial ports 30, 3-1, and 3-2 (=3) for each of the serial interface circuit connection switched 6a, 6b, and 6c (that is, serial port connection switches 9a-0 to 9a-2, 9b-0 to 9b-2, and 9c-0 to 9c-2).

One end of each of the serial port connection switches 9a-0 to 9a-2, 9b-0 to 9b-2, and 9c-0 to 9c-2 is connected respectively to the other end of each of the serial interface circuit connection switch 6a, 6b, or 6c, and the other end of each of the serial port connection switches is connected to serial ports 3-0, 3-1, or 3-2. That is, the serial port connection switch 9a-0 is connected to serial port 3-0, the serial port connection switch 9a-1 to serial port 3-1, and the serial port connection switch 9a-2 to serial port 3-2. These serial interface circuit connection switches 6a, 6b, and 6c and the serial port connection switches 9a-0 9a-2, 9b-0 to 9b-2, and 9c-0 to 9c-2 are switched by a selector control signal.

The serial interface circuit 1c has no buffer connected in order to maintain compatibility with the fourth and fifth embodiments described above. A configuration with a buffer is also possible.

A typical operation of the serial communication circuit of the sixth embodiment which has the above configuration is described. First, to implement the first embodiment configuration (see FIG. 1), the serial port connection switch 9a-0 and the serial port connection switch 9b-0 are turned on or off with the serial interface circuit connection switches 6a and 6b turned on. In this case, the channel is serial port 3-0. For serial ports 3-1 and 3-2, the system control is the same except that the serial port connection switch 9a-0 and the serial port connection switch 9b-0 are other serial port connection switches.

Next, to implement the forth embodiment configuration (see FIG. 8), the serial interface circuit connection switch 6c, serial port connection switch 9c-0, and serial port connection switch 9c-1 are turned on. To implement the fifth embodiment configuration (see FIG. 10), the serial port connection switch 9a-0 and serial port connection switch 9a-1 are turned on to connect the serial port 3-0 to the serial port 3-1.

Although the number of serial interface circuits (1a, 1b, 1c) is equal to the number of serial ports (3-0. 3-1, 3-2), they need not always be equal. The number of serial interface circuits 1a, 1b, and 1c may be more than or less than the number of serial ports. For example, when there are two serial interface circuits 1a and 1b and three serial ports 3-0, 3-1, and 3-2, the serial interface circuit connection switch 6c and serial port connection switches 9c-0 to 9c-2 are removed from the configuration shown in FIG. 14.

The sixth embodiment, which has the selector 500 for controlling the selection of the serial interface circuits 1a, 1b, and 1c and the serial ports 30, 3-1, and 3-2, finds applications in serial communication circuits for a variety of uses. In particular, the configuration of the sixth embodiment may be used primarily for a micro-controller with serial ports. A micro-controller in which the selector control signal is program-controlled, allows the serial port configuration to be changed dynamically. In addition, supplying an external selector control signal to an integrated circuit with no internal program allows the serial communication circuit configuration to be changed dynamically. This function gives the user the ability to configure a serial communication circuit best suited to the user need.

What is claimed is:

1. A serial communication circuit comprising:
   a plurality of serial interface circuits for serial data communication, each serial interface circuit including a shift register for serial/parallel conversion;
   a plurality of send-receive buffers, each connected to one of said plurality of serial interface circuits on a one-to-one basis, said buffers connected to a parallel bus, for storing communication data sent or received by said plurality of serial interface circuits, said buffers storing said communication data in parallel form;
   a serial port through which serial data is sent to or received from said plurality of serial interface circuits; and
   a switch which selectively connects said plurality of serial interface circuits to said serial port.

2. A serial communication circuit as set forth in claim 1, further comprising a switching processing circuit which, upon receiving an empty signal from one of said plurality of buffers and a transfer end signal from the serial interface circuit connected to the buffer, switches a switch to select one of the serial interface circuits other than said serial interface circuit and connects the selected serial interface circuit to the serial port when sending data stored in said plurality of buffers.

3. A serial communication circuit as set forth in claim 1, further comprising a switching processing circuit which, upon receiving a buffer full signal from one of said plurality of buffers and a transfer end signal from the serial interface circuit connected to the buffer, switches a switch to select one of the serial interface circuits other than said serial interface circuit and connects the selected serial interface circuit to the serial port when receiving data received through the serial port into said plurality of buffers.

4. A serial communication circuit comprising:
   a plurality of serial ports through which serial data is sent or received;

a plurality of serial interface circuits for serial data communication, each serial interface circuit connected to one of said serial ports on a one-to-one basis;

a plurality of buffers for storing communication data for use by said plurality of serial interface circuits, said buffers connected to a parallel bus;

a plurality of connection on/off switches, each connected to one of said plurality of serial interface circuits on a one-to-one basis, for turning on or off a connection between one of said plurality of serial interface circuits and one of said plurality of buffers; and a plurality of buffer selection switches, placed between said plurality of buffers and said plurality of connection on/off switches and each connected to one of said plurality of connection on/off switches on a one-to-one basis, for selectively connecting said plurality of buffers to said plurality of connection on/off switches.

5. A serial communication circuit comprising:

a plurality of serial ports through which serial data is sent or received;

a plurality of serial interface circuits for serial data communication, each serial interface circuit connected to one of said serial ports on a one-to-one basis;

a plurality of buffers for storing communication data sent to, or received from, said plurality of serial interface circuits, said buffer s connect ed to a parallel bus;

a buffer selection switch which is placed between one of said plurality of serial interface circuits and said plurality of buffers and which selectively connects said plurality of buffers to one of said plurality of serial interface circuits; and a connection on/off switch which connects one or more serial interface circuits, not connected to said buffer selection switch, to one of said plurality of buffers on a one-to-one basis, for turning on or off a connection between one of said serial interface circuits and one of said plurality buffers.

6. A serial communication circuit comprising:

a serial interface circuit for serial data communication coupled to a parallel bus;

a plurality of serial ports one of which is connected directly to said serial interface circuit; and an on/off switch, with one end connected to said serial interface circuit and with the other end connected to one of said serial ports not directly connected to said serial interface circuit, for turning on or off a connection between said serial interface circuit and one of said serial ports.

7. A serial communication circuit comprising:

a serial interface circuit for serial data communication coupled to a parallel bus;

a plurality of serial ports one of which is connected directly to said serial interface circuit; and a plurality of on/off switches, each with one end connected to said serial interface circuit and with the other end connected, on a one-to-one basis, to one of said plurality of serial ports not directly connected to said serial interface circuit, for turning on or off a connection between said serial interface circuit and said plurality of serial ports.

8. A serial communication circuit as set forth in claim 7, wherein each of said plurality of switches is turned on and off in a time dividing manner.

9. A serial communication circuit comprising:

a serial interface circuit for serial data communication coupled to a parallel bus;

a plurality of serial ports;

a serial interface circuit connection switch which is connected, on a one-to-one basis, to said serial interface circuit and which turns on or off a connection between the serial interface circuit and said plurality of serial ports; and a plurality of serial port connection switches which are placed between said serial interface circuit connection switch and said plurality of serial ports and are connected, on a one-to-one basis, to said plurality of serial ports and which turn on or off a connection between said serial interface circuit connection switch and each of said plurality of serial ports.

10. A serial communication circuit as set forth in claim 9, wherein said plurality of serial port connection switches may be cross-connected.

11. A serial communication circuit comprising:

a plurality of serial interface circuits for serial data communication, said serial interface circuits coupled to a parallel bus;

a plurality of serial ports;

a plurality of serial interface circuit connection switches which are connected, on a one-to-one basis, to said plurality of serial interface circuits and which turn on or off a connection between each serial interface circuit and said plurality of serial ports; and a plurality of serial port connection switches, one serial port connection switch being provided for each of said serial interface circuit connection switches and for each of said serial ports, and which turn on or off a connection between each of said serial interface circuit connection switches and each serial port.

12. A serial communication circuit as set forth in claim 11, further comprising a plurality of buffers each connected, on a one-to-one basis, to said plurality of serial interface circuits.

\* \* \* \* \*